United States Patent [19]

Penning

[11] Patent Number: 4,535,541
[45] Date of Patent: Aug. 20, 1985

[54] DEVICE FOR MEASURING GUIDE ALIGNMENT FOR MINE SHAFTS AND THE LIKE

[75] Inventor: Francis A. Penning, Denver, Colo.

[73] Assignee: Colorado School of Mines, Golden, Colo.

[21] Appl. No.: 593,693

[22] Filed: Mar. 26, 1984

[51] Int. Cl.³ .......................... G01C 9/00; E21B 47/02
[52] U.S. Cl. .................................... 33/1 H; 33/125 R; 33/333; 33/340; 33/366
[58] Field of Search ...................... 33/1 H, 125 R, 302, 33/333, 338, 340, 342, 354, 366

[56] References Cited

U.S. PATENT DOCUMENTS

| 449,920 | 4/1891 | Thorn | 33/342 X |
| 3,077,670 | 2/1963 | Waters | 33/340 X |
| 3,130,495 | 4/1964 | Schulte | 33/1 H |
| 3,238,631 | 3/1966 | Graf | 33/366 X |
| 4,214,374 | 7/1980 | Miotti | 33/302 X |
| 4,357,660 | 11/1982 | Hepp | 33/302 X |

FOREIGN PATENT DOCUMENTS

| 38186 | 4/1965 | German Democratic Rep. | 33/1 H |
| 53-145667 | 12/1978 | Japan | 33/302 |
| 56-76007 | 6/1981 | Japan | 33/366 |

Primary Examiner—Robert S. Ward
Attorney, Agent, or Firm—Edwin H. Crabtree

[57] ABSTRACT

A guide alignment measuring device for mine skips, cages, elevators and other conveyance systems. The device measures misalignment of one or more guides used in vertical shafts or incline shafts in various types of mining operations, elevator shafts and similar operations where materials and personnel are raised and lowered.

14 Claims, 8 Drawing Figures

4,535,541

DEVICE FOR MEASURING GUIDE ALIGNMENT FOR MINE SHAFTS AND THE LIKE

BACKGROUND OF THE INVENTION

This invention relates to a guide alignment device, and more particularly but not by way of limitation, to a guide alignment device used for measuring misalignment of one or more guides used in vertical and incline shafts in mining operations, elevator shafts and other similar operations.

Heretofore, different type of guides for skips, cages, elevators and the like have been installed and aligned using plumb lines, surveying instruments and other types of complex equipment. Also, this type of equipment is used periodically for correcting misalignment. The use of this equipment is time consuming and does not provide the necessary information for quickly determining tilt angles from the vertical of a reference guide nor the alignment of the additional guides in relationship to the reference guide. Further, there have been no devices for providing specifications for tolerance of misalignment as well as direction of misalignment. This type of information would help reduce resonance and impact and improve the speed, the smoothness of ride and reduce maintenance as the skip or elevator is raised and lowered.

In the past the railroad industry has done a great deal or work in the measurement of alignment of horizontal rails. Railroad track has been classified in a range from one to six. The maximum allowable operating speed being ten miles per hour for freight and fifteen miles per hour for passenger trains on a Class 1 track. For Class 6 track a maximum speed of one hundred ten miles per hour may be maintained. Railroad track surveying methods and apparatus are described in the following U.S. Patents. They are U.S. Pat. No. 3,503,132 to Fisher, U.S. Pat. No. 3,643,503 to Plasser et al, U.S. Pat. No. 3,735,495 to Plasser et al, U.S. Pat. No. 3,828,440 to Plasser el al, U.S. Pat. No. 3,835,546 to Jaquet, U.S. Pat. No. 3,869,805 to Dieringer and U.S. Pat. No. 3,990,154 to Theurer el al. None of these prior art patents disclose a guide alignment device for continuously measuring, recording and plotting the amount of misalignment of one or more guides used in a vertical or an inclined shaft. Further, none of the prior art patents discuss obtaining measurements in local and global cartesian coordinate systems, wherein one face of a reference guide is used in orienting the system. Further, there is no disclosure in the prior art of using two orthogonal inclinometers or other gravity sensing devices that use gravity as a vertical reference.

SUMMARY OF THE INVENTION

The subject guide alignment measuring device has been field tested under an operating conveyance system. Guide geometry data have been recorded at a surveying speed of 300 ft. per minute or greater. The device, as it is lowered, records data and can also rerecord data as the device is raised. This method provides a cross-check of the reference data. The device can be rotated 180° to change reference guides thereby providing further cross-checks on the data received.

The data obtained from the guide alignment device are used for correcting misalignment of the guides, providing maintenance records for comparing changes in guide conditions over a period of time more importantly, establishing maximum safe hoisting speeds for material and personnel.

The subject invention greatly advances the state of the art in vertical conveyance systems and can be used in developing a program for applying classifications of mine hoisting guides similar to the classifications used on horizontal railroad tracks.

The guide alignment device is adapted for being raised and lowered in a shaft and engaging one or more guides. The device includes a housing having an instrument shelf therein with a pair of contact arms attached to the housing and having guide rollers mounted on the ends of the arms for engaging the face and sides of a reference guide. A third movable and rotatable arm is also connected to the housing for engaging a second guide. The device further includes a pair of inclinometers for measuring a first and second tilt angle of the instrument shelf from the vertical. Also, transducers are mounted on the instrument shelf for measuring a change in distance between the reference guide and the second guide and a twist angle between the two guides. Aslo, the device includes a measuring wheel for engaging the reference guide and measuring a distance along the length of the reference guide as the alignment device is raised and lowered in the shaft.

The advantages and objects of the invention will become evident from the following detailed description of the drawings when read in connection with the accompanying drawings which illustrate preferred embodiment of the invention.

DETAILED DESCRIPTION OF THE DRAWINGS

Figure 1:
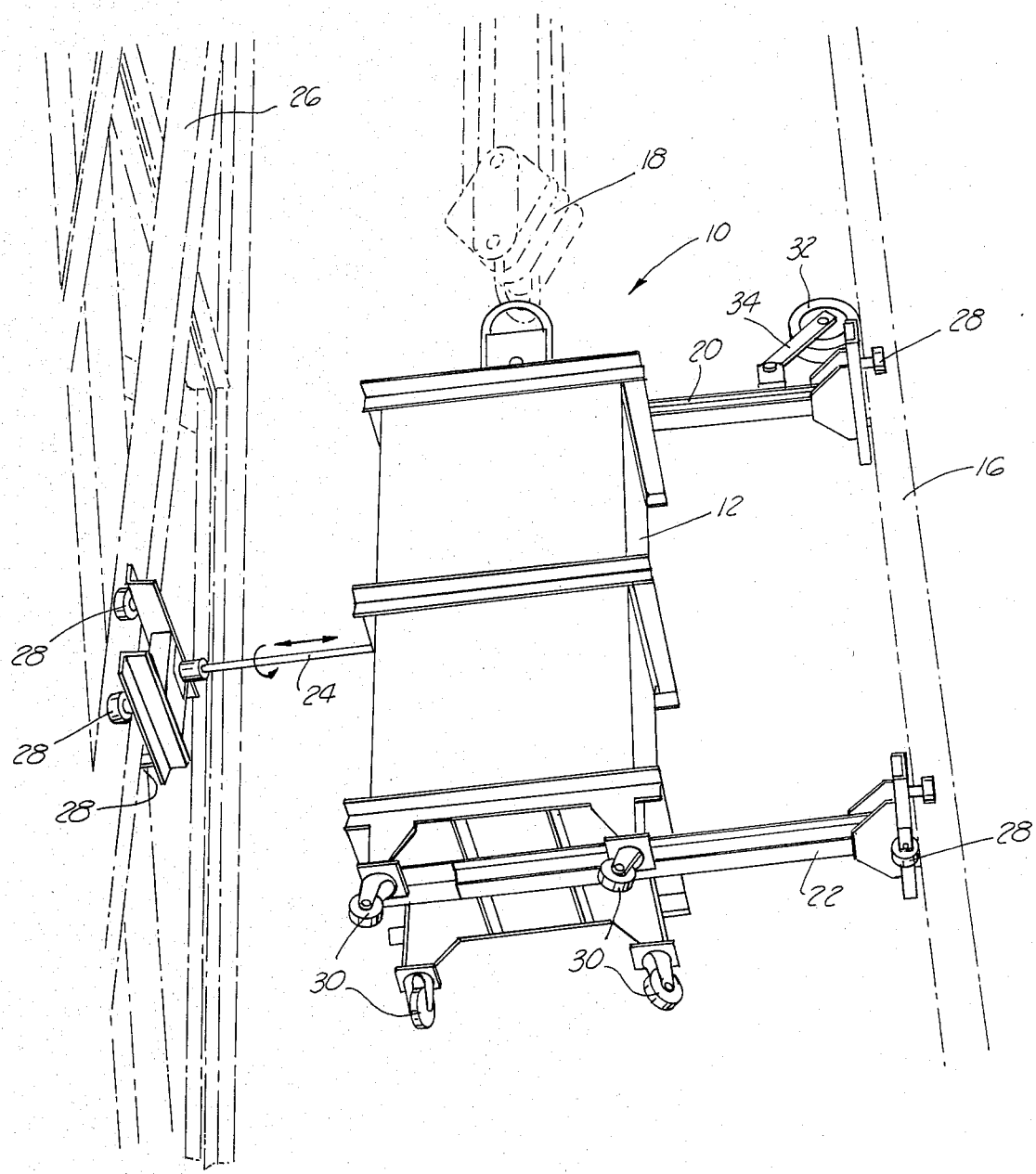
FIG. 1 illustrates a perspective view of the guide alignment device engaging a reference guide and a second guide and suspended from a vertical conveyance system.
Figure 2:
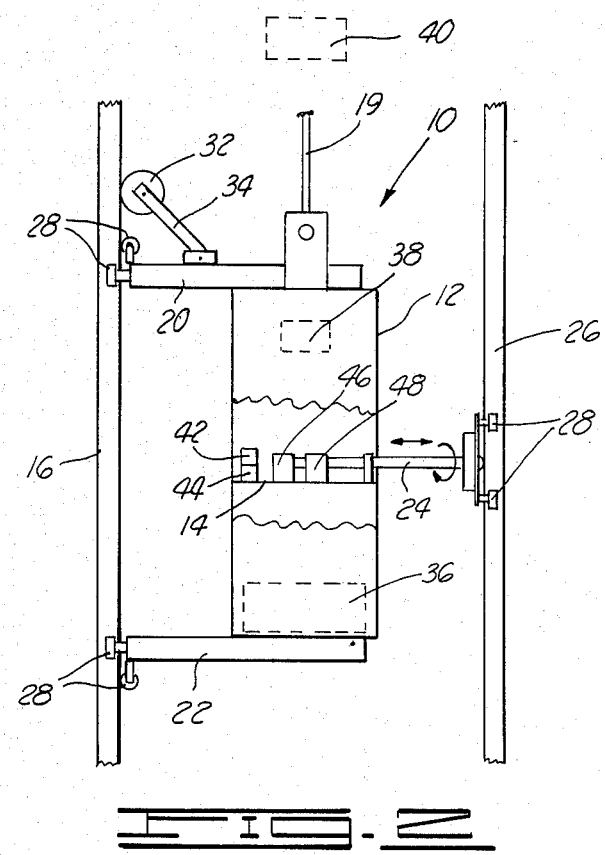
FIG. 2 is a side view of the guide alignment device.

In FIG. 1 a prespective view of the guide alignment device is shown and in FIG. 2 a side view of the device is shown. The guide alignment device is designated by general reference 10. The device 10 includes a housing 12 fabricated to provide an enclosed instrument shelf 14 as shown in FIG. 2. The housing 12 is designed for the shelf 14 to remain perpendicular to a reference guide 16 shown in dotted lines FIG. 1. The device 10 is raised and lowered in a shaft by a conveyance attachment shown in FIG. 1 and designated by numeral 18 or a single cable attachment 19 as shown in FIG. 2.

Extending outwardly and attached to the top and bottom of the housing 12 is a first fixed contact arm 20 and a second fixed contact arm 22 which remain in continuous contact with the reference guide 16. A third movable and rotatable spring loaded contact arm 24 is mounted on the opposite side of the housing 12 and adapted to follow the contour of a second guide 26.

The first, second and third contact arms 20, 22 and 24 further include guide rollers 28 which are mounted on the arms and adjustable for engaging the face and opposite side of the reference guide 16 and second guide 26. It should be noted, while the reference guide 16 and second guide 26 are shown as angular in shape, the guides could be of various geometric configurations and made of various types of material such as wooden guides, metal guides and cables used for properly guiding a mine skip, cage, elevator and other conveyances. Also a plurality of guides could be used for proper guidance.

In FIG. 1 the housing 12 is shown having a plurality of caster wheels 30 mounted on the bottom of the housing for ease in moving the device 10 when it is disengaged from the conveyance system 18. Also, while not shown in FIGS. 1 and 2 the housing 12 may have clear plastic windows for inspection inside the housing 12 and openings for access to the instrument shelf 14.

A distance measuring wheel 32 is shown in both FIGS. 1 and 2 with a wheel support arm 34 having a switch mounted thereon. The switch is not shown in the drawings but is a standard contact switch and is designed in this type of operation for engaging one or more pins mounted on the wheel 32 with the switch opening and closing for each full or fractional revolution of the wheel 32. Each revolution being equal to two feet of travel along the length of the reference guide 16. Mounted in the bottom of the housing and shown in dotted lines is a tape recorder 36 or other electronic, electrical or mechanical device for receiving and storing data from the instruments mounted on instrument shelf 14. Also shown in FIG. 2 is a signal conditioning and calibration device 38 mounted in the top of the housing 12 and a portable power supply 40 which is attached to the conveyance for providing any necessary power required by the instruments on the shelf 14 and the tape recorder 36.

Figure 3:
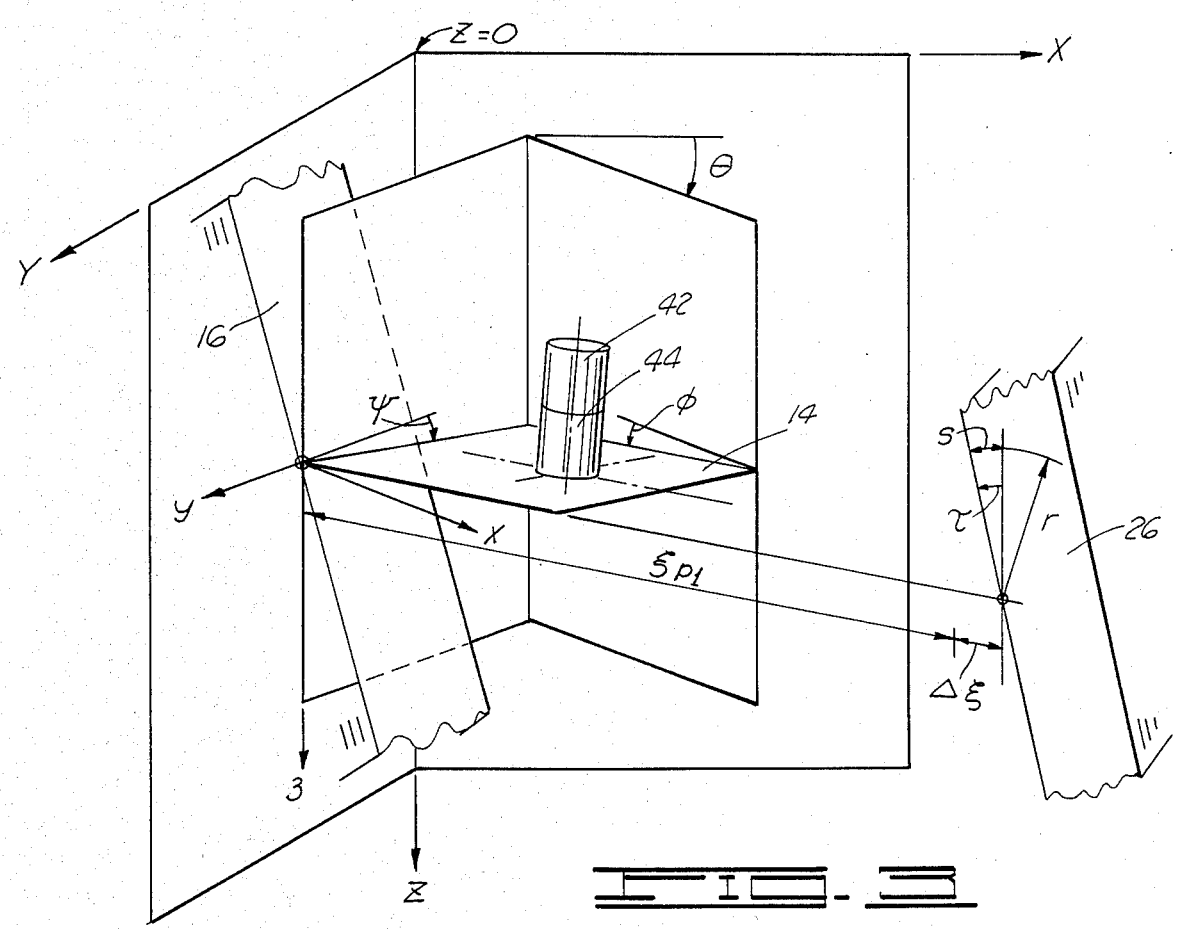
FIG. 3 illustrates the local and global coordinate system for measuring and plotting guide profiles.

Referring now to both FIGS. 2 and 3, the instrument shelf 14 provides a plane embedded in a local coordinate system using gravity to define a vertical axis Z. Angles $\Phi$ and $\Psi$ measure a first and second tilt angle of the reference guides 16 from the vertical by the tilt of the instrument shelf 14.

Changes in nominal distance between the guides 16 and 26 $\Delta\Xi$ and a twist angle $\tau$ between the guides are measured with respect to the instrument shelf 14 using the movable third contact arm 24.

Located in the center of the housing 12 and mounted on the shelf 14 are a pair of inclinometers 42 and 44 whose axes are parallel to the principal axis of the housing 12. The sensitive axis of the first inclinometers 42 is at right angles to the sensitive axis of the other inclinometers 44.

The angles $\Phi$ and $\Psi$ are formed by the intersection of the plane of the instrument shelf 14 with the local xz and yz planes as shown in FIG. 3. The plane of the face of the second guide 26, at the same vertical distance Z, is orientated arbitrarily with respect to the reference guide 16. The change in the nominal dimension of the face to face distance between the two guides 16 and 26 is $\Delta\Xi$, measured by a first displacement transducer 48 shown in FIG. 6 and parallel to the plane of the shelf 14. The angle made by the second guide 26 with respect to the reference guide 16 is measured by the twist or rotation of the movable third contact arm 24 using a second displacement transducer 46. The twist angle $\tau$ is measured in a plane normal to the instrument shelf 14 by recording changes in the arc length, s, at a fixed radius r.

A spring, which is not shown in the drawings, is connected to the spring loaded movable third contact arm 24 and is designed to keep the first and second contact arm 20 and 22 in contact with the reference guide 16 during the survey of the misalignment of the guides.

In FIG. 3, the plane of the instrument shelf is perpendicular to both the plane of the face of the reference guide 16 and its edges. The local coordinate system is oriented so the line of intersection of the plane of the instrument shelf 14 and the reference guide 16 is contained in the yz plane.

Through the use of the two orthogonal inclinometers 42 and 44 and using gravity as a vertical reference, the tilt of the plane of the instrument shelf 14 from the horizontal is measured.

The angle $\Phi$ and $\Psi$ are measured in the xz and yz planes respectively. The vertical axis of the inclinometers is perpendicular to the plane of the shelf 14.

The relative rotation of the local coordinate system with respect to the fixed system is measured by the angle $\Theta$ in the xy plane. The components for sensing and recording analog signals for the angles $\Phi$ and $\Psi$ for the reference guide 16 and the distance $\Delta\Xi$ and angle $\tau$ for the second guide 26 are the inclinometers 42 and 44, displacement transducers 46 and 48, signal 40. Also the distance measurement "Z" from the measuring wheel 32 is recorded as a one volt digital signal for every two feet or fraction thereof of travel.

Figure 4:
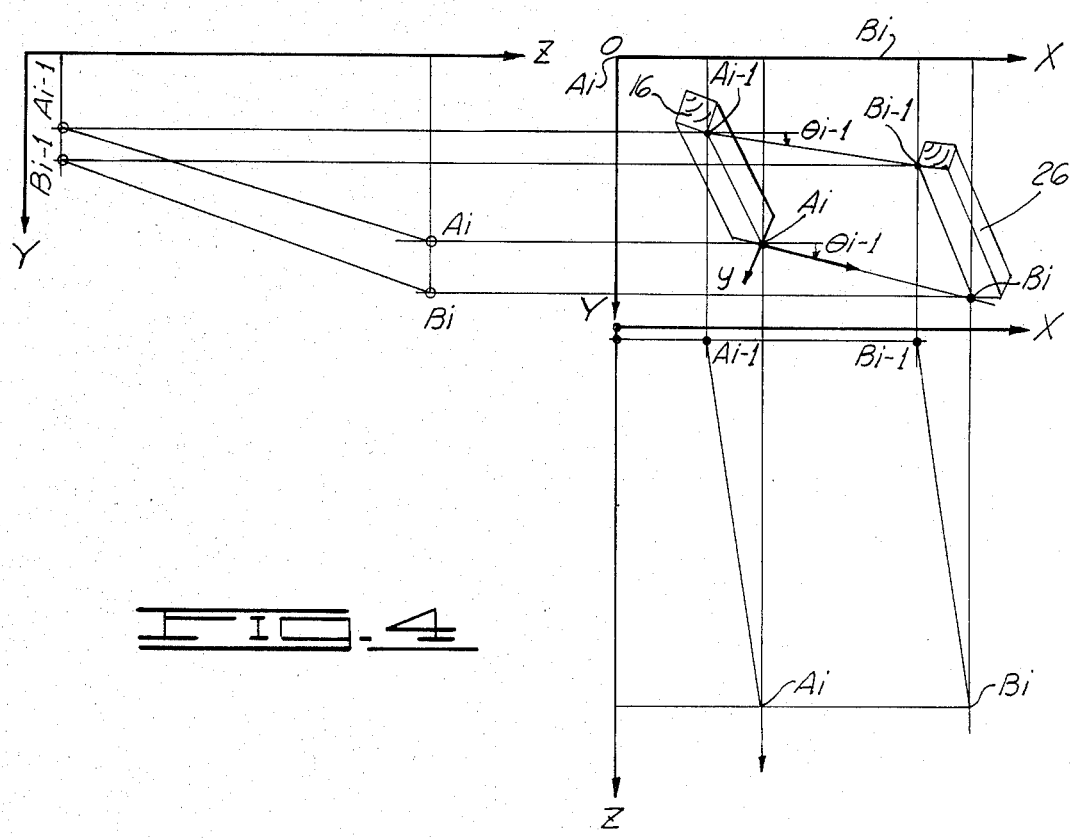
FIG. 4 illustrates projections of the guide edges on global coordinate planes.

Points along the edge of the reference guide 16 and the edge of the second guide 26 are projected on the global XZ and YZ planes as shown in FIG. 4. This is shown at points $A_{i-1}$ and Ai from the reference guide 16 and points $B_{i-1}$ and Bi from the second guide 26. The distances and angle measurements determined from the instrumentation are used with equations of differential geometry for determining the projections on the global planes along the length of the guides 16 and 26.

Figures 5, 6, 7:
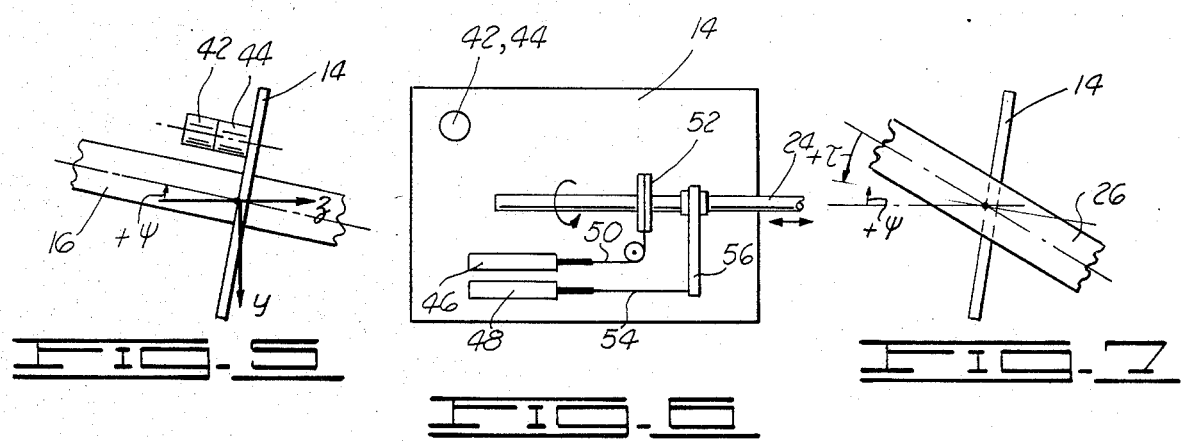
FIGS. 5, 6, 7 and 8 illustrate the individual instruments mounted on the instrument shelf of the guide alignment housing.

In FIG. 6 a top view of the instrument shelf 14 is shown with the transducer 46 connected to a wire 50 mounted on a rotating pulley 52 connected to the third contact arm 24. As the arm 24 turns, the pulley 52 rotates, moving the wire 50 and displacing the transducer 46 for measuring arc length, s, related to measuring the angle $\tau$. The second transducer 48 is connected by a wire 54 to an arm 56 which moves back and forth with the movable third contact arm 24 when there is a change in the face to face dimension between the reference guide 16 and second guide 26. Both of the transducers 46 and 48 are linear displacement transducers and are connectecd to the contact arm 24 in such a way that they are uncoupled from each other and move independently.

Figure 8:
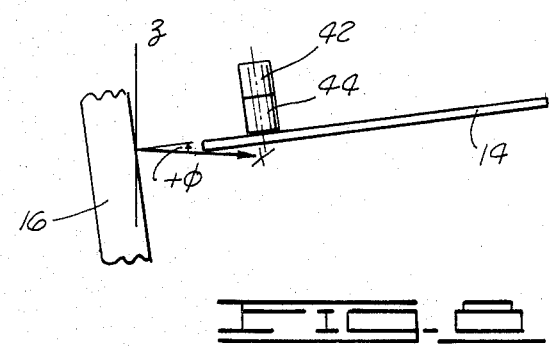

FIG. 5 and FIG. 7 illustrate opposite side views of the instrument shelf 14 shwon in FIG. 6 and including a portion of the reference guide 16 and second guide 26. FIG. 8 shows an edge view of the instrument shelf 14 and reference guide 16 positioned for measuring the angle $\Phi$.

While the inclinometers 42 and 44 are shown in the above mentioned drawings it should be kept in mind that plumb bobs, pendulums, gyroscopes and any other device could be used equally well when requiring measurements from a vertical axis z. Likewise, while the two transducers 46 and 48 are used for measuring $\Delta\Xi$ and $\tau$ other linear displacement or angle sensing devices could be used without departing from the scope of the invention.

From the above discussion of the guide alignment device 10, it can now be appreciated that the required distances along the length of the reference guide 16, tilt angles, twist angle and distance between guides can be quickly obtained and stored in the tape recorder 36. This information providing the necessary data for properly aligning one or more guides and improving the overall safety and speed of mine skips, cages, elevators and the like.

Changes may be made in the construction and arrangement of the parts or elements of the embodiments as described herein without departing from the spirit or scope of the invention defined in the following claims.

What is claimed is:

1. A guide alignment measuring device adapted for being raised and lowered in a vertical or inclined shaft and engaging one or more guides, the device comprising:
   a housing having an instrument shelf therein;
   a first contact arm attached to the housing and engaging a reference guide; and
   a first inclination means received on the instrument shelf for measuring a first tilt angle of the instrument shelf from the vertical as the device is raised and lowered.

2. The device as described in claim 1 further including a second inclination means received on the instrument shelf for measuring a second tilt angle of the instrument shelf from the vertical as the device is raised and lowered.

3. The device as described in claim 1 further including a second contact arm attached to the housing and engaging the reference guide.

4. The device as described in claim 3 further including a third contact arm attached to the housing and engaging a second guide.

5. The device as described in claim 4 further including means for measuring the change in distance between the reference guide and the second guide as the device is raised and lowered and received on the instrument shelf and connected to the third contact arm.

6. The device as described in claim 5 wherein the first contact arm and second contact arm are fixed and the third contact arm is movable and free to rotate and connected to a means for measuring a twist angle made by the second guide with respect to the reference guide.

7. The device as described in claim 1 further including a measuring wheel mounted on the housing, the wheel engaging the reference guide for measuring a distance along the length of the reference guide.

8. A guide alignment measuring device adapted for being raised and lowered in a vertical or inclined shaft and engaging one or more guides, the device comprising:
   a housing having an instrument shelf therein;
   a first contact arm attached at one end to the housing and having guide rollers mounted on the other end for engaging the face and sides of a reference guide;
   a second contact arm attached at one end to the housing and having guide rollers mounted on the other end for engaging the face and sides of the reference guide;
   a third contact arm attached at one end to the housing and having guide rollers mounted on the other end for engaging the face and sides of a second guide;
   a first inclination means received on the instrument shelf for measuring a first tilt angle of the instrument shelf from the vertical as the device is raised and lowered; and
   a second inclination means received on the instrument shelf for measuring a second tilt angle of the instrument shelf from the vertical as the device is raised and lowered.

9. The device as described in claim 8 further including a measuring wheel mounted on the first contact arm, the wheel engaging the reference guide for measuring a distance along the length of the reference guide.

10. The device as described in claim 8 further including means for measuring the change in distance between the reference guide and the second guide as the device is raised and lowered and received on the instrument shelf and connected to the third contact arm.

11. The device as described in claim 10 wherein the means for measuring the change in distance between the reference guide and the second guide is a transducer.

12. The device as described in claim 8 wherein the third contact arm is movable and free to rotate and connected to a means for measuring a twist angle made by the second guide with respect to the reference guide.

13. The device as described in claim 12 wherein the means for measuring a twist angle is a transducer.

14. The device as described in claim 8 wherein first inclination means and second inclination means are inclinometers mounted on the instrument shelf for measuring the first tile angle and second tilt angle.

* * * * *